United States Patent
Kwon et al.

(10) Patent No.: US 12,280,659 B1
(45) Date of Patent: Apr. 22, 2025

(54) ELECTRIC VEHICLE DRIVE APPARATUS

(71) Applicants: Hyundai Motor Company, Seoul (KR); Kia Corporation, Seoul (KR)

(72) Inventors: Sun-Sung Kwon, Anyang-si (KR); Chon-Ok Kim, Yongin-si (KR); Baek-Yu Kim, Hwaseong-si (KR); Chul-Min Ahn, Anyang-si (KR); Sang-Jin Park, Hwaseong-si (KR); Sung-Gon Byun, Hwaseong-si (KR); Won-Seok Lee, Suwon-si (KR); Jun-Young Ha, Gwacheon-si (KR); Su-Hyeon Maeng, Seoul (KR); Dong-Hui Cheon, Seoul (KR); Ji-Eun Kim, Hwaseong-si (KR); Yo-Han Kim, Busan (KR); Jae-Hyuk Seo, Anyang-si (KR); Jong-Ho Jung, Hwaseong-si (KR); Hyun-Ho Lee, Seoul (KR); Yun-Kyung Ji, Seoul (KR); Jong-Yun Park, Yongin-si (KR); Tae-Sic Park, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/600,166

(22) Filed: Mar. 8, 2024

(30) Foreign Application Priority Data

Dec. 4, 2023 (KR) .......................... 10-2023-173499

(51) Int. Cl.
*F16H 48/36* (2012.01)
*B60K 1/02* (2006.01)
(Continued)

(52) U.S. Cl.
CPC ................ *B60K 17/16* (2013.01); *B60K 1/02* (2013.01); *B60K 17/12* (2013.01); *F16H 48/36* (2013.01);
(Continued)

(58) Field of Classification Search
CPC .......... B60Y 2300/82; F16H 2048/364; B60K 2001/001
See application file for complete search history.

(56) References Cited

U.S. PATENT DOCUMENTS

| 5,845,732 A | 12/1998 | Taniguchi et al. |
| 6,557,656 B2 | 5/2003 | Haniu et al. |

(Continued)

FOREIGN PATENT DOCUMENTS

| CN | 114008354 A | 2/2022 |
| DE | 102017109764 A1 * | 11/2018 |

(Continued)

*Primary Examiner* — Sherry L Estremsky
(74) *Attorney, Agent, or Firm* — Slater Matsil, LLP

(57) ABSTRACT

An embodiment electric vehicle drive apparatus for decreasing a drive speed of a motor and transferring the decreased drive speed to an output shaft is provided. The apparatus includes a first planetary gear set including three first planetary gear elements in which a first element is connected to the motor and a second element is connected to a first output shaft, a second planetary gear set including three second planetary gear elements in which a first element is connected to a third element of the three first planetary gear elements, a second element is connected to a second output shaft, and a third element is fixed, and a third planetary gear set including three third planetary gear elements in which first and second elements are connected to two elements of the three first planetary gear elements, respectively, and a third element is connected to a torque vectoring motor.

15 Claims, 14 Drawing Sheets

(51) Int. Cl.
*B60K 17/12* (2006.01)
*B60K 17/16* (2006.01)

(52) U.S. Cl.
CPC ..... *B60Y 2300/82* (2013.01); *F16H 2048/364* (2013.01); *F16H 2702/02* (2013.01)

(56) References Cited

U.S. PATENT DOCUMENTS

| | | | |
|---|---|---|---|
| 9,302,580 B2 * | 4/2016 | Smetana | B60L 15/2036 |
| 9,701,187 B2 * | 7/2017 | Smetana | B60K 6/48 |
| 9,855,830 B2 * | 1/2018 | Knoblauch | B60K 1/00 |
| 10,400,877 B2 * | 9/2019 | Pinschmidt | B60K 6/48 |
| 10,596,895 B2 | 3/2020 | Morio et al. | |
| 10,641,375 B2 | 5/2020 | Kurth | |
| 10,774,913 B2 | 9/2020 | Koyama | |
| 11,098,795 B2 * | 8/2021 | Ahn | B60W 30/18145 |
| 11,305,630 B2 * | 4/2022 | Lee | B60W 10/115 |
| 11,618,318 B2 * | 4/2023 | Beck | F16H 48/10 |
| | | | 475/5 |
| 11,752,862 B2 | 9/2023 | Wang et al. | |

FOREIGN PATENT DOCUMENTS

| | | | |
|---|---|---|---|
| DE | 102021006118 B3 * | 3/2023 | F16H 48/10 |
| JP | 2009143562 A | 7/2009 | |
| JP | 2017053430 A | 3/2017 | |
| JP | 2019113133 A | 7/2019 | |
| KR | 20190068968 A | 6/2019 | |
| WO | 2005120877 A1 | 12/2005 | |

* cited by examiner (S1 : DRIVE MOTOR INPUT, C1 : LH OUTPUT, R2 : RH OUTPUT)

(S1 : DRIVE MOTOR INPUT, C1 : LH OUTPUT, C2 : RH OUTPUT)

ELECTRIC VEHICLE DRIVE APPARATUS

CROSS-REFERENCE TO RELATED APPLICATIONS

This application claims the benefit of Korean Patent Application No. 10-2023-0173499, filed on Dec. 4, 2023, which application is hereby incorporated herein by reference in its entirety.

TECHNICAL FIELD

The present disclosure relates to an electric vehicle drive apparatus.

BACKGROUND

Electric vehicle drive apparatuses transfer motive power generated by a motor to a drive shaft connected to wheels. These electric drive apparatuses require a speed reducer, particularly, a planetary gear speed reducer, which is configured to transfer a greater motive power when compared with a speed reduction ratio of planetary gear elements, such as a sun gear, a ring gear, and a carrier.

A differential function refers to a function for distributing a torque to left and right wheels when a vehicle travels in a circle. A torque vectoring function is to adjust a ratio for a torque that is distributed to the left and right wheels by actively controlling the differential function.

However, in the related art, a torque vectoring structure, used as the structure of the speed reducer performing the differential function, requires the addition of two sets of planetary gears to a differential, thereby increasing the full length. In addition, because the speed reducer employs a structure where a separate differential is not mounted, it is difficult to incorporate the torque vectoring structure used in the related art.

The matters described above are intended to help understand the background of the present disclosure and may include matters that, although referred to as the related art, are not publicly known.

SUMMARY

The present disclosure relates to an electric vehicle drive apparatus. Particular embodiments relate to a drive apparatus enabling a speed reduction function and a torque vectoring function to be performed.

An embodiment of the present disclosure provides an electric vehicle drive apparatus capable of enabling a speed reduction function and a torque vectoring function to be performed by combining planetary gears, thereby minimizing an increase in full length.

According to an embodiment of the present disclosure, there is provided an electric vehicle drive apparatus for decreasing a drive speed of a motor and transferring the decreased drive speed to an output shaft. The apparatus includes a first planetary gear set including three first planetary gear elements, a first sun gear, a first carrier, and a first ring gear, one element of the three first planetary gear elements being connected to the motor, and another element of the three first planetary gear elements being connected to a first output shaft, a second planetary gear set including three second planetary gear elements, a second sun gear, a second carrier, and a second ring gear, one element of the three second planetary gear elements being connected to the remaining element of the three first planetary gear elements, another element of the three second planetary gear elements being connected to a second output shaft, and the remaining element of the three second planetary gear elements being fixed, and a third planetary gear set including three third planetary gear elements, a third sun gear, a third carrier, and a third ring gear, two elements of the three third planetary gear elements being connected to two elements of the three first planetary gear elements, respectively, and the remaining element of the three third planetary gear elements being connected to a torque vectoring motor.

In the electric vehicle drive apparatus, two elements of the three third planetary gear elements may be connected to two elements, respectively, of the three first planetary gear elements that are not connected to the motor.

In the electric vehicle drive apparatus, a gear ratio of the third planetary gear set may result from a combination of gear ratios that achieve a speed of o of the element connected to the torque vectoring motor in a straight forward traveling condition in which a differential does not occur.

In the electric vehicle drive apparatus, the third planetary gear set may be a single pinion planetary set, and the third sun gear of the three third planetary gear elements may be connected to the first ring gear in the first planetary gear set, the third ring gear may be connected to the first carrier, and the third carrier may be connected to the torque vectoring motor.

In the electric vehicle drive apparatus, the third planetary gear set may be a single pinion planetary set, and the third sun gear of the three third planetary gear elements may be connected to the first carrier in the first planetary gear set, the third ring gear may be connected to the first ring gear, and the third carrier may be connected to the torque vectoring motor.

In the electric vehicle drive apparatus, when a gear ratio of the first planetary gear set is assumed to be $\lambda_1 = Z_{R1}/Z_{S1}$, the following equations may be established: a gear ratio of the second planetary gear set $\lambda_2 = 1/\lambda_1 + 2$; and a speed reduction ratio $= 1 + \lambda_1 \lambda_2$, and a gear ratio of the third planetary gear set may be established with the following relationship: $\lambda_3 : \lambda_2 - 1$.

In the electric vehicle drive apparatus, when an element in the third planetary gear set is rotated in the same direction as the output shaft by driving the torque vectoring motor in one direction, a speed of the first output shaft may be increased, and a speed of the second output shaft may be decreased.

In the electric vehicle drive apparatus, when an element in the third planetary gear set is rotated in the opposite direction to the output shaft by driving the torque vectoring motor in the opposite direction to the one direction, the speed of the first output shaft may be decreased, and the speed of the second output shaft may be increased.

In the electric vehicle drive apparatus, an element in the third planetary gear set that is to be connected to the torque vectoring motor may be connected to the torque vectoring motor through a speed reduction mechanism.

In the electric vehicle drive apparatus, the third planetary gear set may be a double pinion planetary gear set, and the third sun gear of the three third planetary gear elements may be connected to the first carrier in the first planetary gear set, the third carrier may be connected to the first ring gear, and the third ring gear may be connected to the torque vectoring motor.

In the electric vehicle drive apparatus, when a gear ratio of the first planetary gear set is assumed to be $\lambda_1 = Z_{R1}/Z_{S1}$, the following equations may be established: a gear ratio of the second planetary gear set $\lambda_2 = 1/\lambda_1 + 2$; and a speed reduction ratio=$1+\lambda_1\lambda_2$, and a gear ratio of the third planetary gear set may be established with the following relationship: $\lambda_3=\lambda_2/(\lambda_2-1)$.

In the electric vehicle drive apparatus, the third planetary gear set may be a double pinion planetary gear set, and the third sun gear that is the third planetary gear element may be connected to the first ring gear in the first planetary gear set, the third carrier may be connected to the first carrier, and the third ring gear may be connected to the torque vectoring motor.

In the electric vehicle drive apparatus, the third planetary gear set may be a double pinion planetary gear set, and the third sun gear of the three third planetary gear elements may be connected to the first ring gear in the first planetary gear set, the third carrier may be connected to the first carrier, and the third ring gear may be connected to the torque vectoring motor.

In the electric vehicle drive apparatus, when a gear ratio of the first planetary gear set is assumed to be $\lambda_1=Z_{R1}/Z_{S1}$, the following equations may be established: a gear ratio of the second planetary gear set $\lambda_2=1/\lambda_1+2$; and a speed reduction ratio=$1+\lambda_1\lambda_2$, and a gear ratio of the third planetary gear set may be established with the following relationship: $\lambda_3=\lambda_2$.

In the electric vehicle drive apparatus, an element of the three second planetary gear elements that is to be connected to the remaining element of the three first planetary gear elements and is to be connected to another element is directly connected to the remaining element of the three first planetary gear elements.

According to another embodiment of the present disclosure, there is provided an electric vehicle drive apparatus for decreasing a drive speed of a motor and transferring the decreased drive speed to an output shaft. The apparatus includes a first planetary gear set including three first planetary gear elements, a first sun gear, a first carrier, and a first ring gear, one element of the three first planetary gear elements being connected to the motor and another element of the three first planetary gear elements being connected to a first output shaft, a second planetary gear set including three second planetary gear elements, a second sun gear, a second carrier, and a second ring gear, one element of the three second planetary gear elements being connected to a second output shaft, and a third planetary gear set including three third planetary gear elements, a third sun gear, a third carrier, a third ring gear, one element of the three third planetary gear elements being connected to another element of the three second planetary gear elements, two elements of the three third planetary gear elements, which are not connected to the motor, being connected to two elements, respectively, of the three first planetary gear elements, and the remaining element of the three third planetary gear elements being connected to a torque vectoring motor.

According to still another embodiment of the present disclosure, there is provided an electric vehicle drive apparatus for decreasing a drive speed of a motor and transferring the decreased drive speed to an output shaft. The apparatus includes a first planetary gear set including three first planetary gear elements, a first sun gear, a first carrier, and a first ring gear, one element of the three first planetary gear elements being connected to the motor, and another element of the three first planetary gear elements being connected to a first output shaft, a second planetary gear set including three second planetary gear elements, a second sun gear, a second carrier, and a second ring gear, one element of the three second planetary gear elements being connected to the remaining element of the three first planetary gear elements, and another element of the three second planetary gear elements being connected to a second output shaft, and a third planetary gear set including three third planetary gear elements, a third sun gear, a third carrier, and a third ring gear, the third sun gear being configured as the same element as the first ring gear, another element of the three third planetary gear elements being connected to one element of the three first planetary gear elements that is not connected to the motor, and the remaining element of the three third planetary gear elements being connected to a torque vectoring motor.

Usually, in order to realize a torque vectoring function, two sets of planetary gears are required to be added. However, with the structure according to embodiments of the present disclosure, it is possible to realize the torque vectoring function by adding only one set of planetary gears, thereby reducing the manufacturing cost.

In a case where a planetary gear and the like are added to realize the torque vectoring function, an in-line type speed reducer has an increased full length, thereby causing a problem with mountability. However, with the structure according to embodiments of the present disclosure, an increase in full length can be minimized. Thus, the torque vectoring function can be added to the in-line speed reducer and mountability can be ensured.

In addition, in a case where planetary gears that constitute the speed reducer are arranged in a double row configuration, the torque vectoring function can be added while further reducing the full length. Therefore, this approach can also address situations where increasing a motor size is necessary to enhance the output of a high-performance vehicle.

The structure according to embodiments of the present disclosure is applicable to all structures of the speed reducer that perform speed reduction and differential using two sets of planetary gears.

DETAILED DESCRIPTION OF ILLUSTRATIVE EMBODIMENTS

To fully understand the embodiments of the present disclosure, including operational advantages thereof, and the features that may be accomplished by preferred embodiments thereof, reference should be made to the accompanying drawings in which the preferred embodiments thereof are illustrated and the contents of the drawings.

A description of a well-known technology associated with the preferred embodiments of the present disclosure, when it makes the nature and gist of the present disclosure unnecessarily obfuscated, is shortened or omitted.

Figure 1:
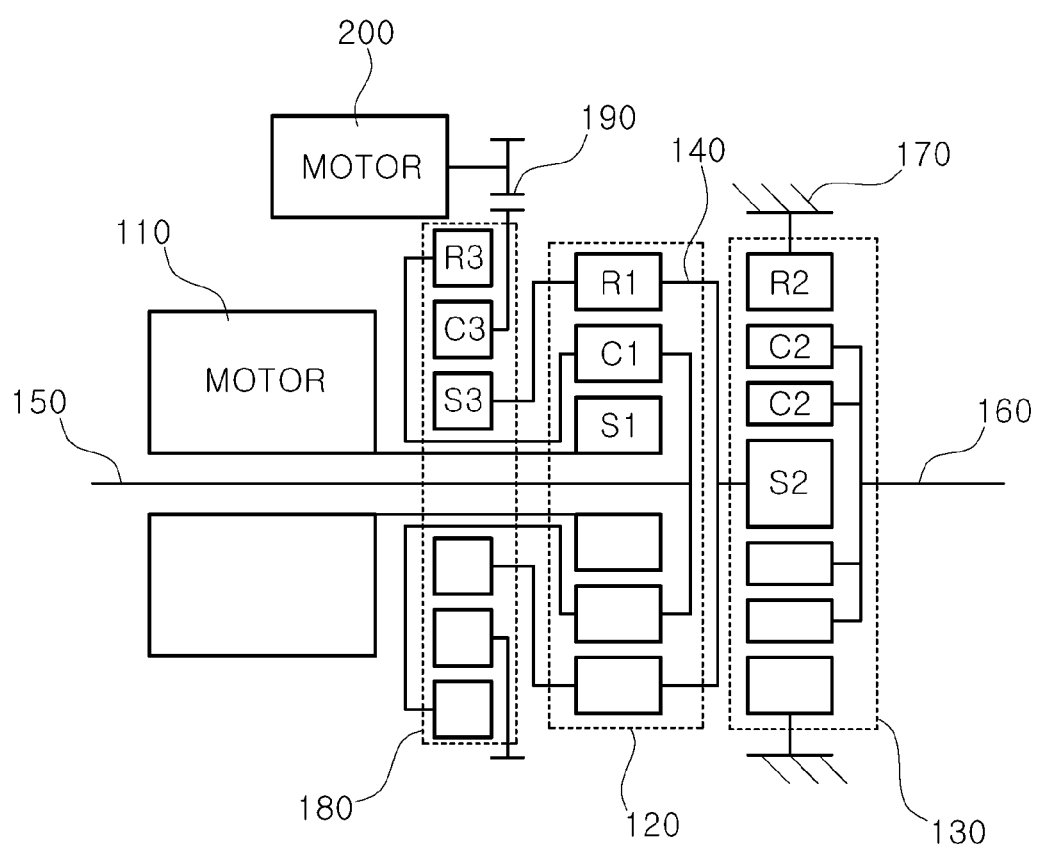
FIG. 1 is a schematic diagram illustrating an electric vehicle drive apparatus according to a first embodiment of the present disclosure.

FIG. 1 is a schematic diagram illustrating an electric vehicle drive apparatus according to a first embodiment. FIGS. 2 to 8 are lever diagrams that are referenced to describe a differential and a torque vectoring function.

The electric vehicle drive apparatus according to the first embodiment of the present disclosure is described below with reference to FIGS. 1 to 8.

With reference to FIG. 1, the electric vehicle drive apparatus according to the first embodiment of the present disclosure is configured not only to function as a speed reducer but also to perform the torque vectoring function, by adding a third planetary gear set 180 to a first planetary gear set 120 and a second planetary gear set 130.

Each planetary gear set is configured with three planetary gear elements: a sun gear, a carrier, and a ring gear.

That is, the first planetary gear set 120 includes first planetary gear elements including a first sun gear S1, a first carrier C1, and a first ring gear R1. Likewise, the second planetary gear set 130 includes second planetary gear elements including a second sun gear S2, a second carrier C2, and a second ring gear R2. In a similar fashion, the third planetary gear set 180 includes third planetary gear elements including a third sun gear S3, a third carrier C3, and a third ring gear R3.

The first sun gear S1, one element in the first planetary gear set 120, is connected to an input shaft of a motor 110. The first ring gear R1, another element therein, is connected to the second planetary gear set 130 directly or through a connection member 140. The first carrier C1, the remaining element therein, is connected to a first output shaft 150.

One element in the second planetary gear set 130 that is connected to the first planetary gear set 120 may be the second sun gear S2. The second ring gear R2, another element in the second planetary gear set 130, is fixed to a speed reducer casing 170, and the second carrier C2, the remaining element therein, is connected to a second output shaft 160.

The first output shaft 150 and the second output shaft 160 are coupled to left and right wheels, respectively. A speed reduction function and a differential function are performed as a result of a gear ratio between the first planetary gear set 120 and the second planetary gear set 130 that are combined as described above.

Moreover, two elements of the third planetary gear set 180 are connected to two elements, respectively, that are not connected to the motor 110, of the three planetary gear elements of the first planetary gear set 120.

That is, the first ring gear R1 in the first planetary gear set 120 may be connected to the third sun gear S3 in the third planetary gear set 180, and the first carrier C1 of the first planetary gear set 120 may be connected to the third ring gear R3 of the third planetary gear set 180.

The third carrier C3, the remaining element in the third planetary gear set 180, is connected to a torque vectoring motor 200 directly or through a speed reduction mechanism 190.

A gear ratio of the third planetary gear set 180 results from a combination of gear ratios that achieve a speed of o of the element C3 connected to the torque vectoring motor 200 in a straight forward traveling condition in which a differential does not occur.

The operating principle behind the electric vehicle drive apparatus is described with reference to FIGS. 2 to 6.

Figure 2:
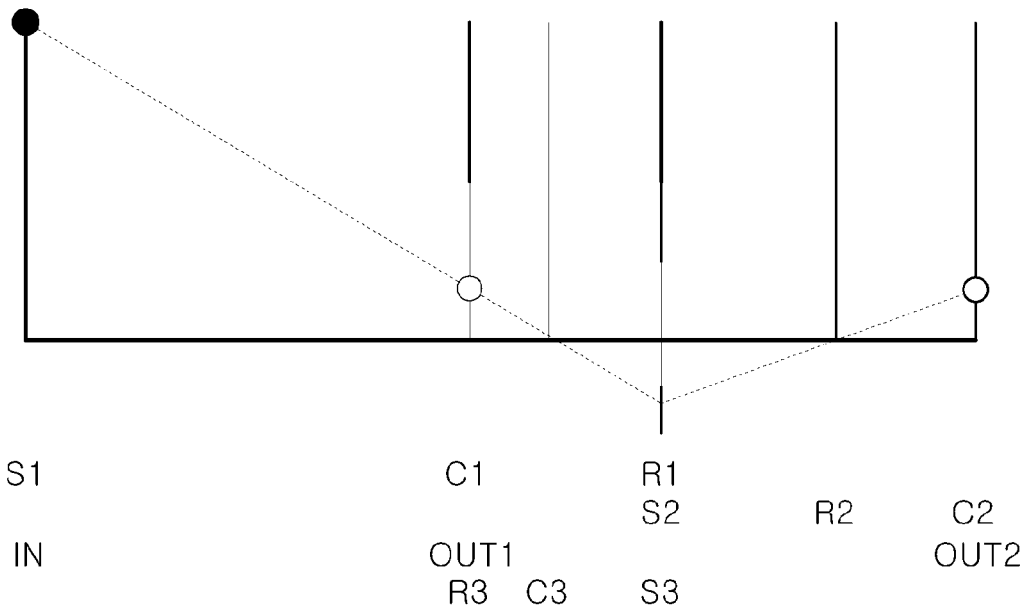
FIGS. 2 to 8 are lever diagrams that are referenced to describe a differential and a torque vectoring function.

With reference to FIG. 2, in the straight forward traveling condition, motive power is transferred to output shafts on both sides at the same speed as a torque, at a speed reduction ratio that is determined by the first planetary gear set 120 and the second planetary gear set 130. At this time, the element C3 connected to the torque vectoring motor 200, of the elements in the third planetary gear set 180, is in a stationary state.

Figure 3:
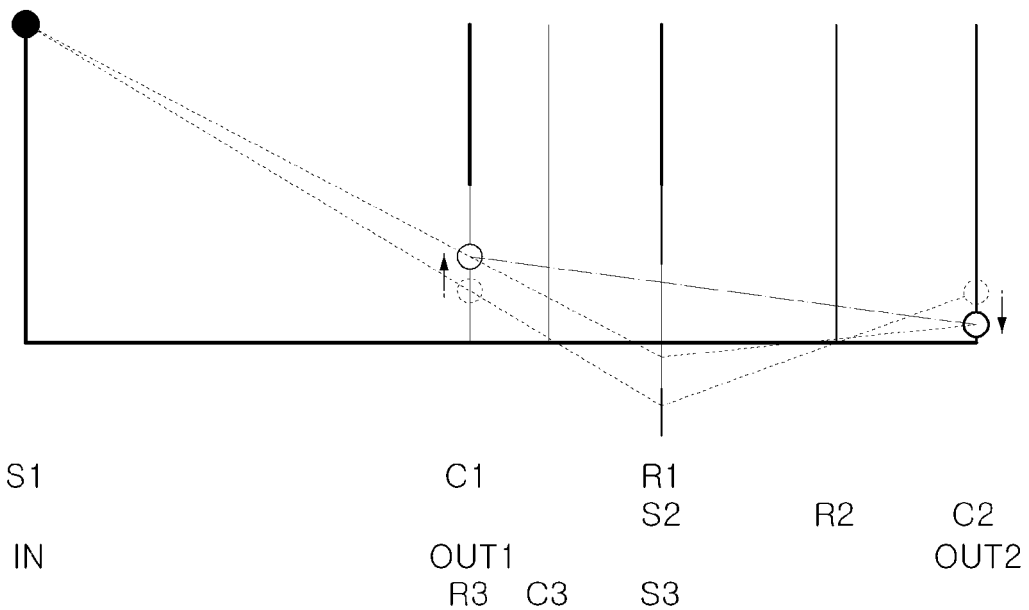

As illustrated in FIG. 3, the occurrence of a differential increases a speed of the first output shaft and decreases a speed of the second output shaft. When this is done, the element C3 connected to the torque vectoring motor 200 for the third planetary gear set 180 is rotated in the same direction as the output shaft.

Figure 4:
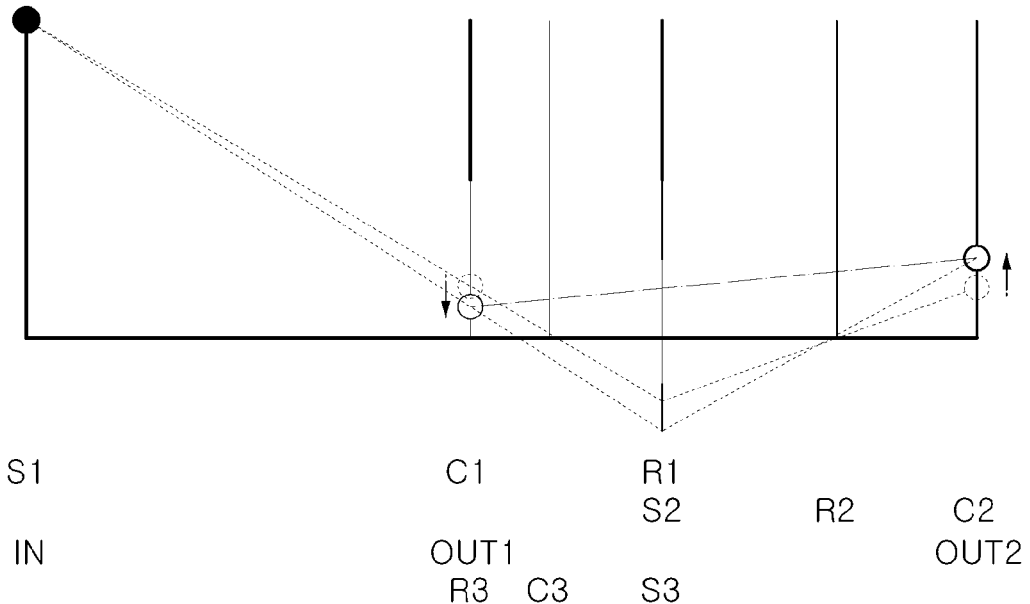

As illustrated in FIG. 4, the occurrence in the opposite direction of a differential decreases a speed of the first output shaft and increases a speed of the second output shaft. When this is done, the element C3 connected to the torque vectoring motor 200 is rotated in the opposite direction to the output shaft.

Figure 5:
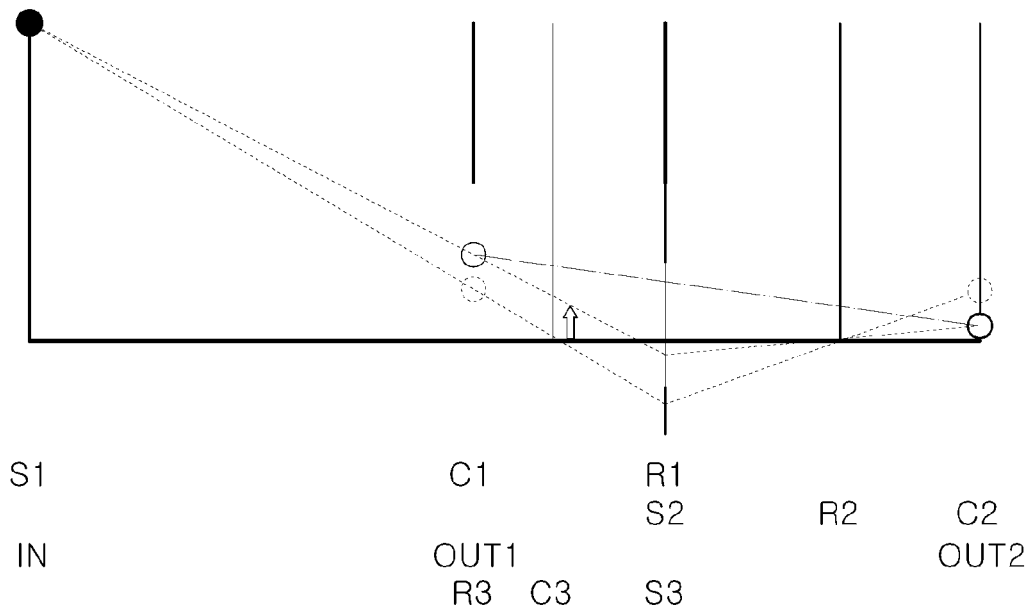

Next, as illustrated in FIG. 5, when the element C3 in the third planetary gear set 180 is rotated in the same direction as the output shaft by driving the torque vectoring motor 200, the speed of the first output shaft is increased, and the speed of the second output shaft is decreased, thereby performing the torque vectoring function.

Figure 6:
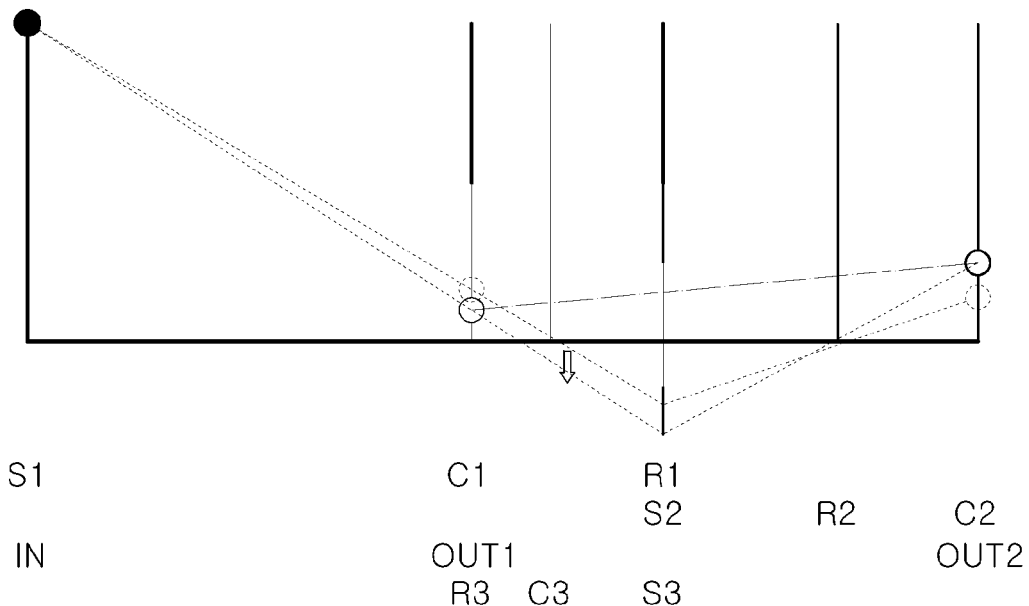

As illustrated in FIG. 6, when the element C3 in the third planetary gear set 180 is rotated in the opposite direction to the output shaft by driving the torque vectoring motor 200 in the opposite direction, the speed of the first output shaft is decreased, and the speed of the second output shaft is increased, thereby performing the torque vectoring function in the opposite direction.

In the first embodiment of the present disclosure, a single pinion planetary gear is used in the third planetary gear set 180. Furthermore, the third sun gear S3 in the third planetary gear set 180 and the first ring gear R1 in the first planetary gear set 120 are connected to each other, the third ring gear R3 in the third planetary gear set 180 and the first carrier C1 in the first planetary gear set 120 are connected to each other, and the torque vectoring motor 200 is connected to the third carrier C3 in the third planetary gear set 180.

Figure 9:
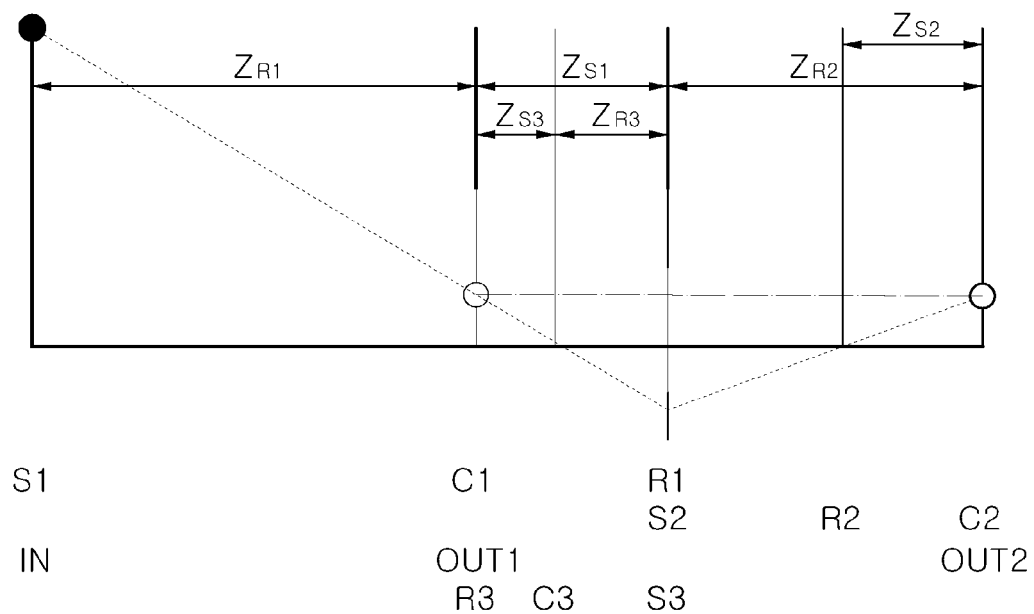
FIG. 9 is a lever diagram, illustrating the electric vehicle drive apparatus according to the first embodiment of the present disclosure that is referenced to describe a speed reduction ratio.

With reference to FIG. 9, when a planetary gear ratio is assumed to be $\lambda_1 = Z_{R1}/Z_{S1}$, the following equations are established: $\lambda_2 = 1/\lambda_1 + 2$; and a speed reduction ratio $= 1 +_1 \lambda_2$.

At this point, a planetary gear ratio for torque vectoring is defined as $\lambda_3 : \lambda_2 - 1$.

Embodiments of the present disclosure are possibly embodied in various ways according to a planetary gear connection technique and are required to satisfy the following two conditions.

1) Deep Function Determination: The same torque is output in a state where speeds of the left and right wheels are the same, i.e., Z_R2=(Z_R1+1)/Z_R1.

2) Vectoring Function Determination: Torques having the same magnitude are output in the opposite directions in a state where speeds of the left and right wheels are the same.

Figure 7:
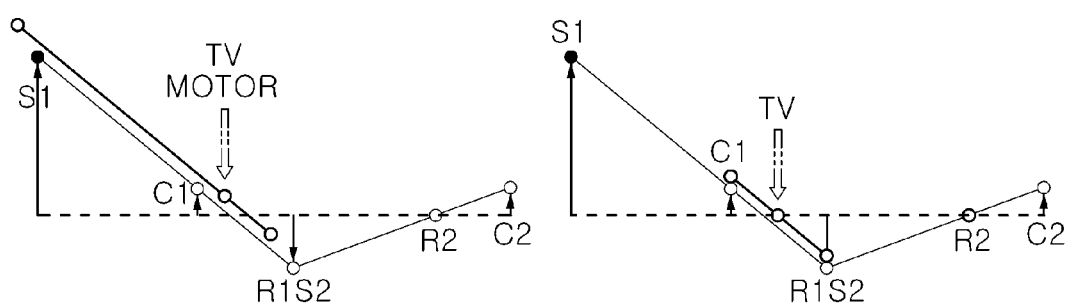
Figure 8:
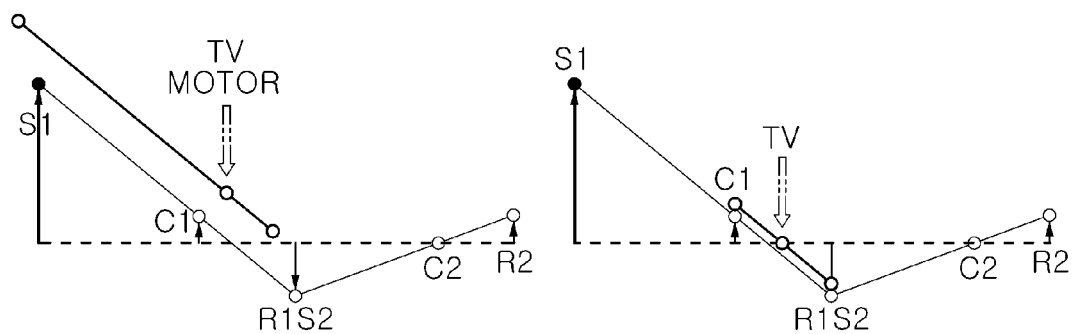

A structure configured with three planetary gears satisfying the above-mentioned conditions is a lever structure as illustrated in FIGS. 7 and 8. Various embodiments may be implemented according to how each element in the third planetary gear set 180 is connected to each element in the first planetary gear set 120 and each element in the second planetary gear set 130.

Figure 10:
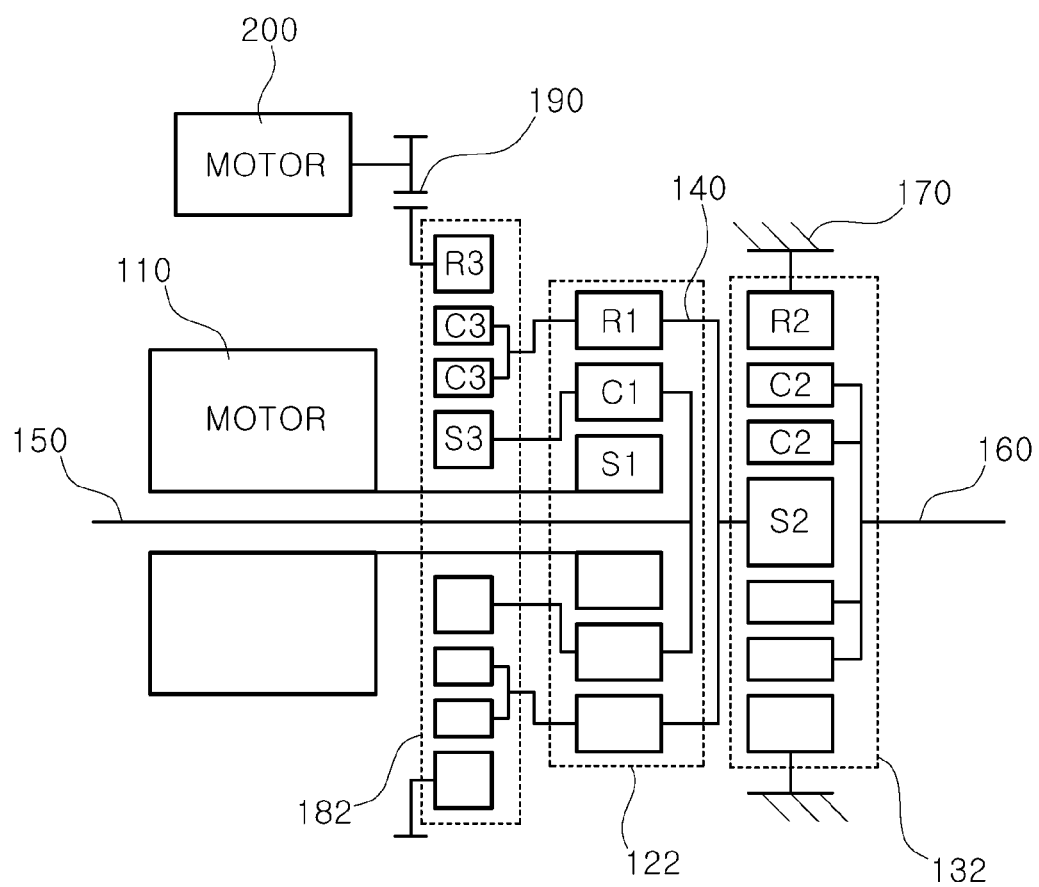
FIG. 10 is a schematic diagram illustrating an electric vehicle drive apparatus according to a second embodiment of the present disclosure.
Figure 11:
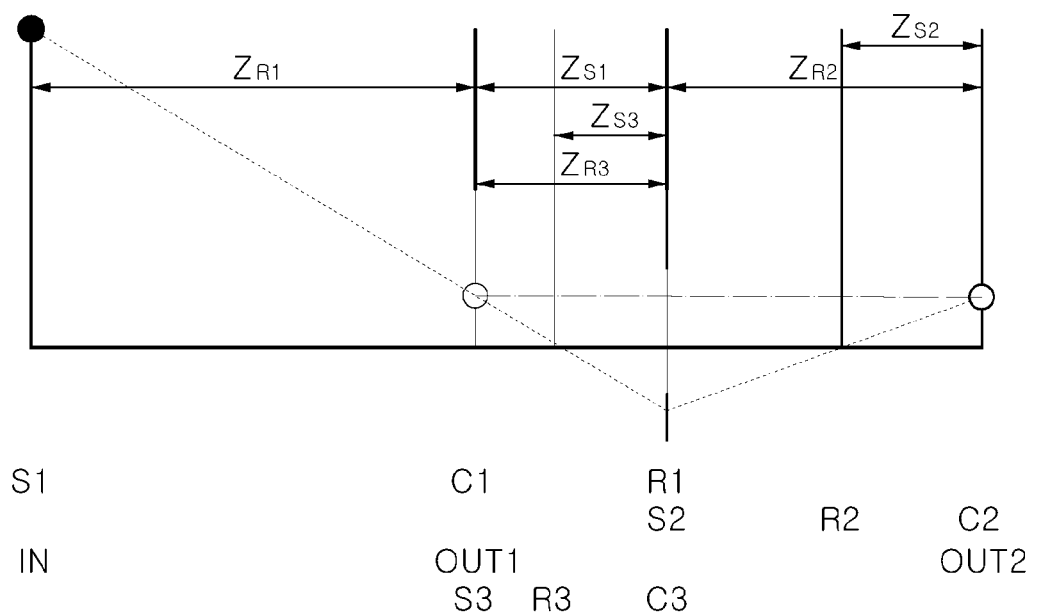
FIG. 11 is a lever diagram illustrating the electric vehicle drive apparatus according to the second embodiment of the present disclosure in FIG. 10.

FIG. 10 is a schematic diagram illustrating an electric vehicle drive apparatus according to a second embodiment of the present disclosure. FIG. 11 is a lever diagram illustrating the electric vehicle drive apparatus according to the second embodiment of the present disclosure in FIG. 10.

In the electric vehicle drive apparatus according to the second embodiment of the present disclosure, a double pinion planetary gear may be used as a torque vectoring planetary gear. Furthermore, a third sun gear S3 in a third planetary gear set 182 and a first carrier C1 in a first planetary gear set 122 may be connected to each other, a third carrier C3 in the third planetary gear set 182 and a first ring gear R1 in the first planetary gear set 122 may be connected to each other, and a torque vectoring motor 200 may be connected to a third ring gear R3 in the third planetary gear set 182.

When a planetary gear ratio is assumed to be $\lambda_1=Z_{R1}/Z_{S1}$, the following equations are established: $\lambda_2=1/\lambda_1+2$; and a speed reduction ratio=$1+_1\lambda_2$.

At this point, a planetary gear ratio for torque vectoring is defined as $\lambda_3=\lambda_2/(\lambda_2-1)$.

Figure 12:
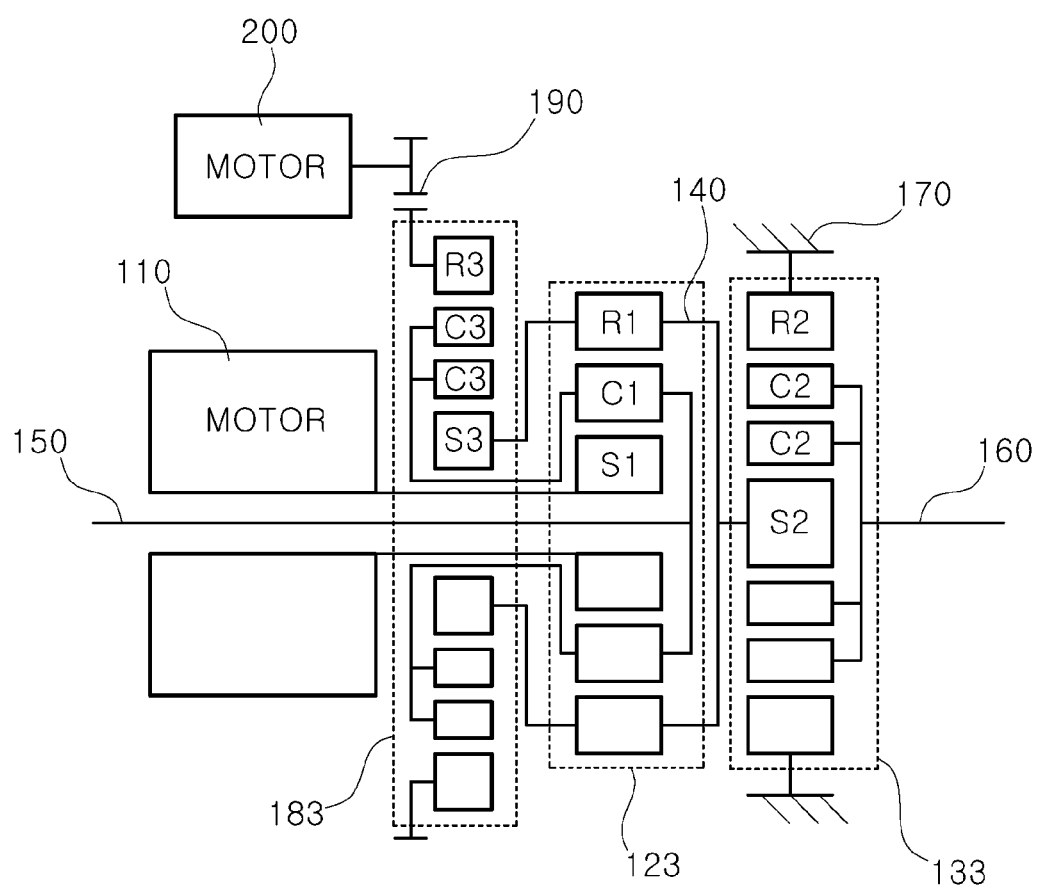
FIG. 12 is a schematic diagram illustrating an electric vehicle drive apparatus according to a third embodiment of the present disclosure.
Figure 13:
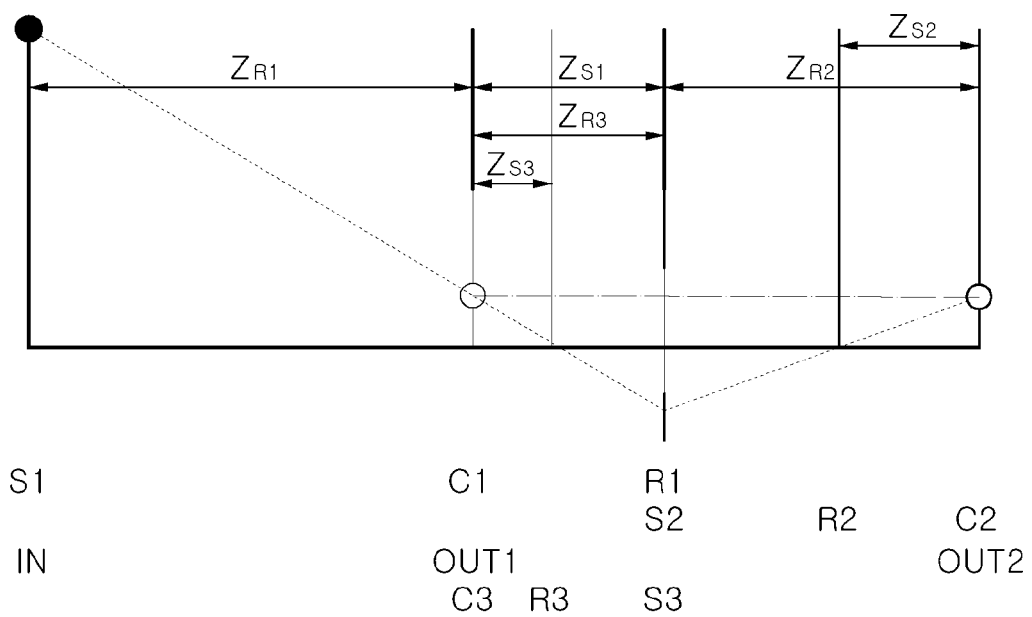
FIG. 13 is a lever diagram illustrating the electric vehicle drive apparatus according to the third embodiment of the present disclosure in FIG. 12.

FIG. 12 is a schematic diagram illustrating an electric vehicle drive apparatus according to a third embodiment of the present disclosure. FIG. 13 is a lever diagram illustrating the electric vehicle drive apparatus according to the third embodiment of the present disclosure in FIG. 12.

In the electric vehicle drive apparatus according to the third embodiment of the present disclosure, a double pinion planetary gear may be used as a torque vectoring planetary gear. Furthermore, a third sun gear S3 in a third planetary gear set 183 and a first ring gear R1 in a first planetary gear set 123 may be connected to each other, a third carrier C3 in the third planetary gear set 183 and a first carrier C1 in the first planetary gear set 123 may be connected to each other, and a torque vectoring motor 200 may be connected to a third ring gear R3 in the third planetary gear set 183.

When a planetary gear ratio is assumed to be $\lambda_1=Z_{R1}/Z_{S1}$, the following equations are established: $\lambda_2=1/\lambda_1+2$; and a speed reduction ratio=$1+_1\lambda_2$.

At this point, a planetary gear ratio for torque vectoring is defined as $\lambda_3=\lambda_2$.

Figure 14:
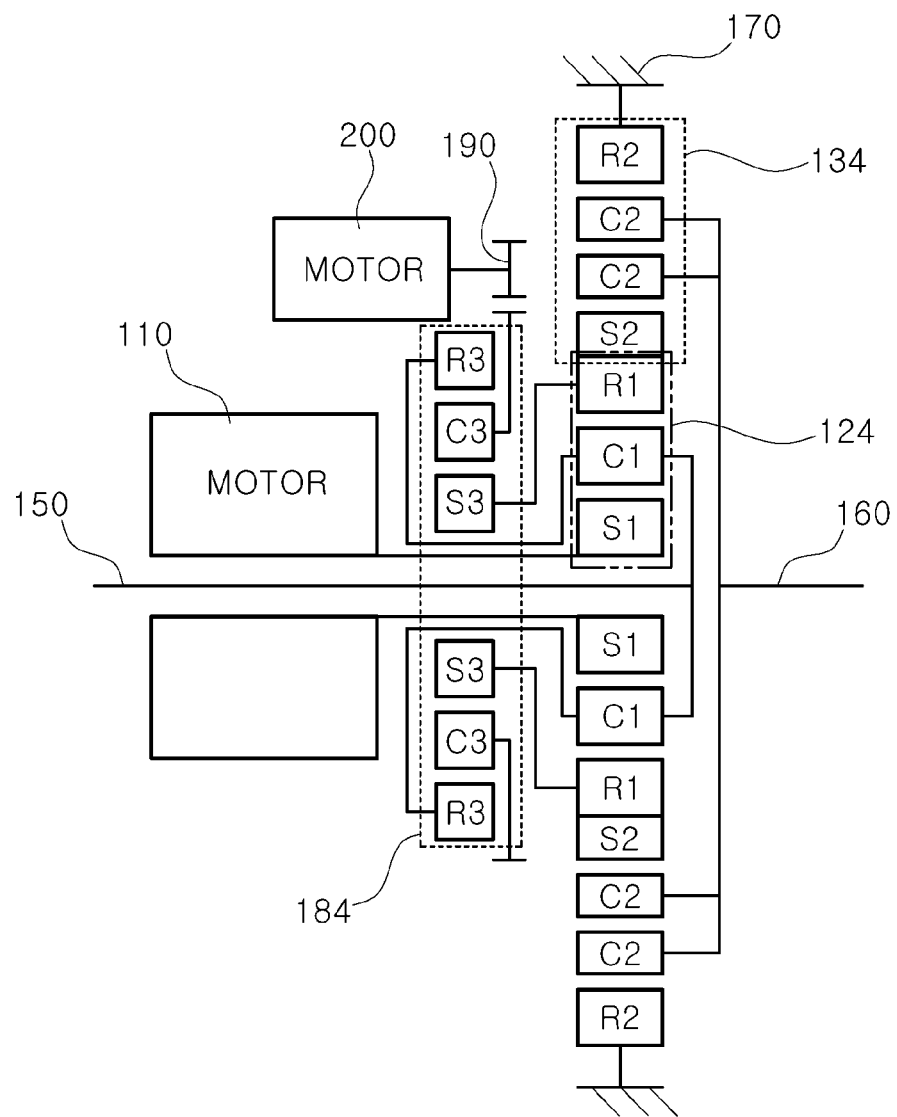
FIG. 14 is a schematic diagram illustrating an electric vehicle drive apparatus according to a fourth embodiment of the present disclosure.
Figure 15:
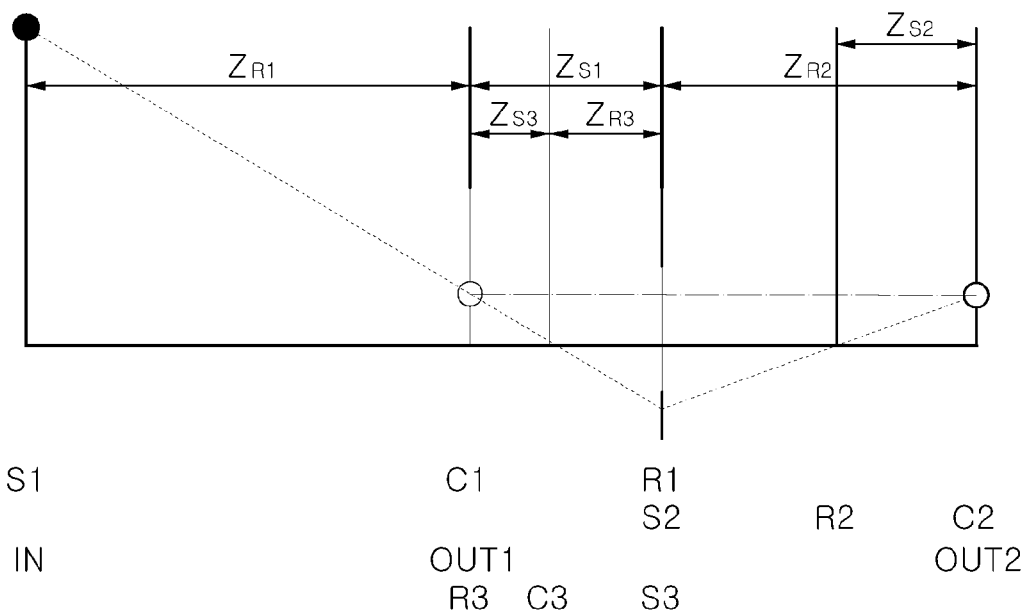
FIG. 15 is a lever diagram illustrating the electric vehicle drive apparatus according to the fourth embodiment of the present disclosure in FIG. 14.

FIG. 14 is a schematic diagram illustrating an electric vehicle drive apparatus according to a fourth embodiment of the present disclosure. FIG. 15 is a lever diagram illustrating the electric vehicle drive apparatus according to the fourth embodiment of the present disclosure in FIG. 14.

A structure where a second sun gear S2 in a second planetary gear set 134 that constitutes the speed reducer is directly connected to the outside of a first ring gear R1 in a first planetary gear set 124 is employed. A connection structure of a torque vectoring planetary gear is the same as in the first embodiment.

A single pinion planetary gear may be used as a torque vectoring planetary gear. Furthermore, a third sun gear S3 in a third planetary gear set 184 and a first ring gear R1 in a first planetary gear set 124 may be connected to each other, a third ring gear R3 in the third planetary gear set 184 and a first carrier C1 in the first planetary gear set 124 may be connected to each other, and a torque vectoring motor 200 may be connected to a third carrier C3 in the third planetary gear set 184.

When a planetary gear ratio is assumed to be $\lambda_1=Z_{R1}/Z_{S1}$, the following equations are established: $\lambda_2=1/\lambda_1+2$; and a speed reduction ratio=$1+_1\lambda_2$.

At this point, a planetary gear ratio for torque vectoring is defined as $\lambda_3=\lambda_2-1$.

Moreover, various modifications may be made to the electric vehicle drive apparatus according to embodiments of the present disclosure, as illustrated in FIGS. 16 to 19.

Figure 16:
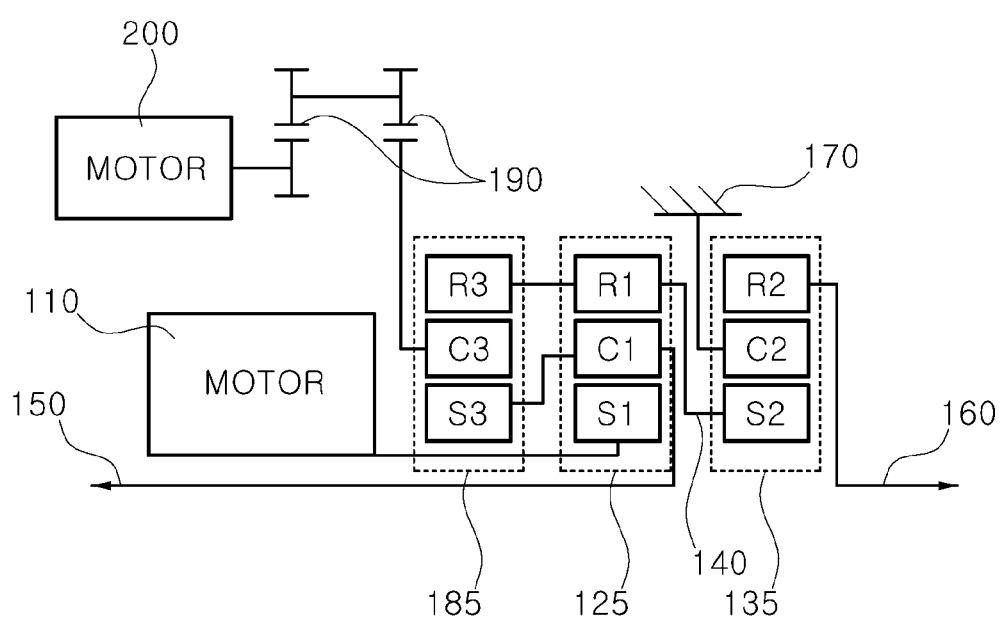
FIGS. 16 to 19 are schematic diagrams sequentially illustrating electric vehicle drive apparatuses according to fifth to eighth embodiments, respectively, of the present disclosure.

An electric vehicle drive apparatus according to a fifth embodiment of the present disclosure, which is illustrated in FIG. 16, is different from the electric vehicle drive apparatus according to the first embodiment of the present disclosure. The difference is that, in the electric vehicle drive apparatus according to the fifth embodiment, a first carrier C1 in a first planetary gear set 125 is connected to a third sun gear S3 in a third planetary gear set 185 and a first ring gear R1 in the first planetary gear set 125 is connected to a third ring gear R3 in the third planetary gear set 185. A second ring gear R2 in a second planetary gear set 135 is connected to the second output shaft 160.

Figure 17:
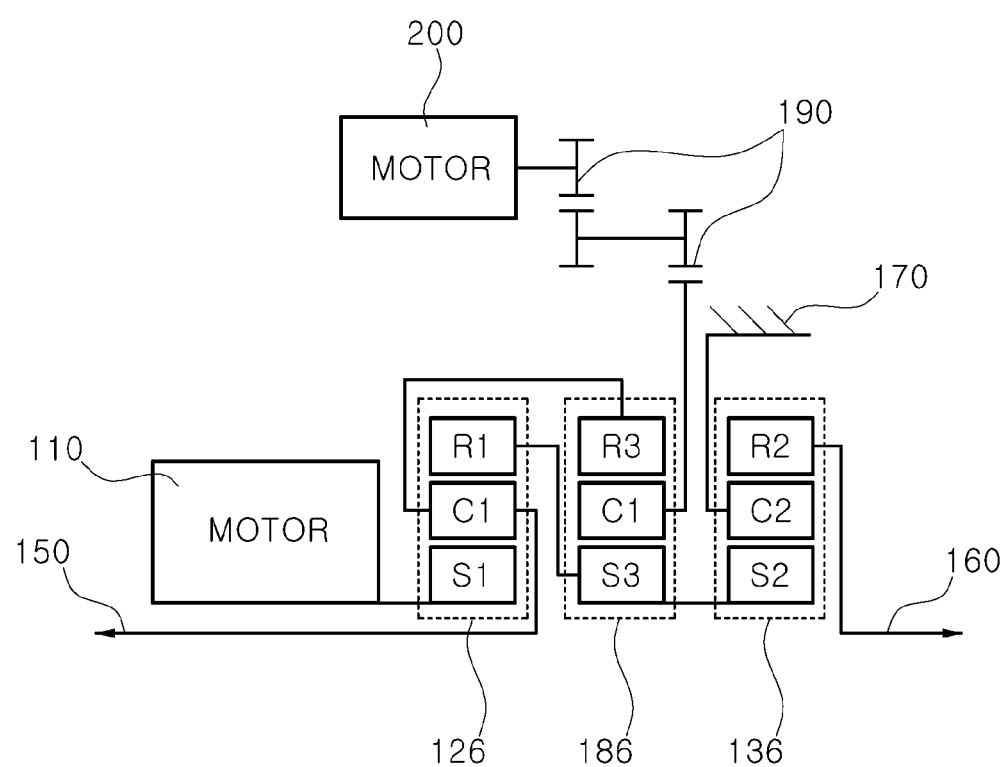

An electric vehicle drive apparatus according to a sixth embodiment of the present disclosure, which is illustrated in FIG. 17, is different from the electric vehicle drive apparatus according to the first embodiment of the present disclosure. The difference is that, in the electric vehicle drive apparatus according to the sixth embodiment of the present disclosure, a third sun gear S3 in a third planetary gear set 186 instead of a first planetary gear set 126 is connected to a second sun gear S2 in a second planetary gear set 136 and a second ring gear R2 in a second planetary gear set 136 is connected to the second output shaft 160.

Figure 18:
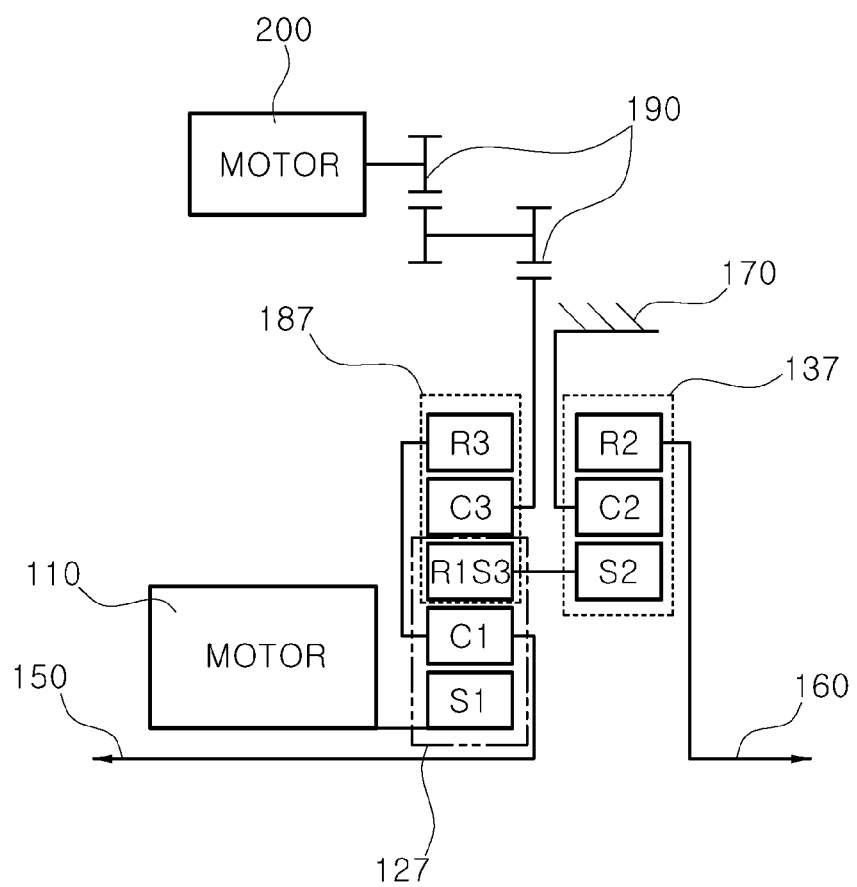

In an electric vehicle drive apparatus according to a seventh embodiment of the present embodiment, which is illustrated in FIG. 18, a first ring gear in a first planetary gear set 127 and a third sun gear S3 in a third planetary gear set 187 are configured into one element. This resulting element is connected to a second sun gear S2 in a second planetary gear set 137. A second ring gear R2 in the second planetary gear set 137 is connected to the second output shaft 160.

Figure 19:
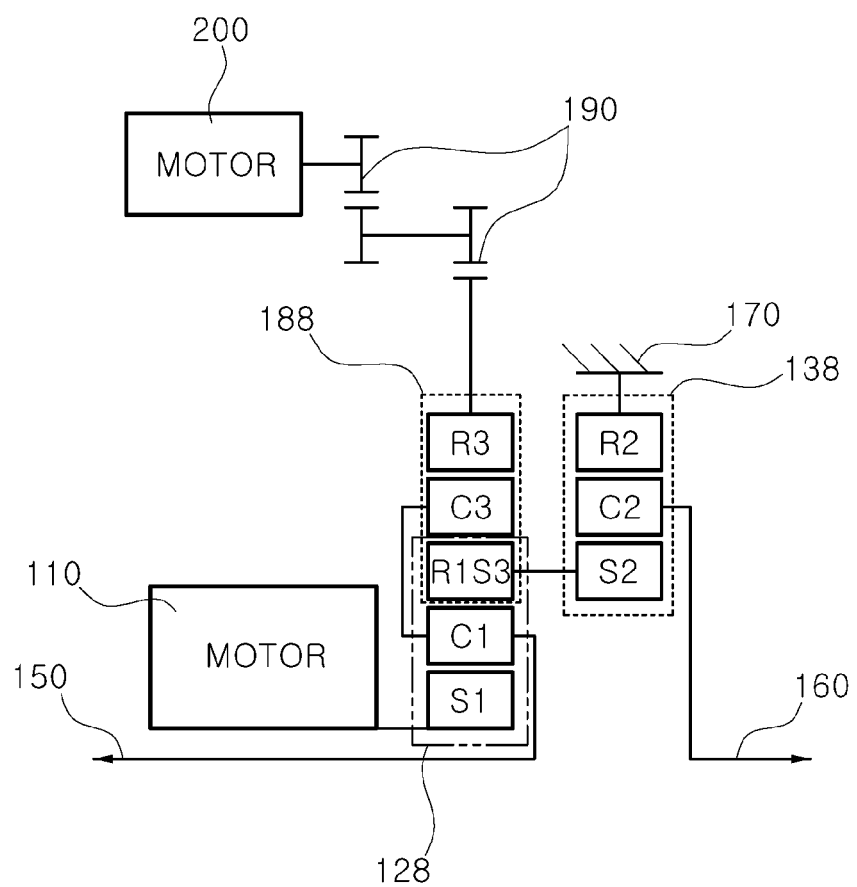

In an electric vehicle drive apparatus according to an eighth embodiment of the present disclosure, which is illustrated in FIG. 19, a first ring gear R1 in a first planetary gear set 128 and a third sun gear S3 in a third planetary gear set 188 are configured into one element. This resulting element is connected to a second sun gear S2 in a second planetary gear set 138. A first carrier C1 in the first planetary gear set 128 is connected to a third carrier C3 in the third planetary gear set 188. A second carrier C2 in the second planetary gear set 138 is connected to the second output shaft 160.

Exemplary embodiments of the present disclosure are described above with reference to the accompanying drawings. However, the embodiments of the present disclosure are not limited to the exemplary embodiments. It would be apparent to a person of ordinary skill in the art that various modifications and alterations of the embodiments may possibly be made within the scope that does not depart from the nature and gist of the present disclosure. The resulting modification or alteration examples should fall within the scope of the claims of the present disclosure. The scope of the embodiments of the present disclosure should be defined by the following claims.

What is claimed is:

1. An electric vehicle drive apparatus for decreasing a drive speed of a motor and transferring the decreased drive speed to an output shaft, the apparatus comprising:
 a first planetary gear set comprising three first planetary gear elements, the three first planetary gear elements comprising a first sun gear, a first carrier, and a first ring gear, wherein:
  a first element of the three first planetary gear elements is connected to the motor; and
  a second element of the three first planetary gear elements is connected to a first output shaft;
 a second planetary gear set comprising three second planetary gear elements, the three second planetary gear elements comprising a second sun gear, a second carrier, and a second ring gear, wherein:
  a first element of the three second planetary gear elements is connected to a third element of the three first planetary gear elements;
  a second element of the three second planetary gear elements is connected to a second output shaft; and
  a third element of the three second planetary gear elements is fixed; and
 a third planetary gear set comprising three third planetary gear elements, the three third planetary gear elements comprising a third sun gear, a third carrier, and a third ring gear, wherein:
  a first element and a second element of the three third planetary gear elements are connected to two elements of the three first planetary gear elements, respectively, and a third element of the three third planetary gear elements is connected to a torque vectoring motor,
 wherein the first element of the three third planetary gear elements is connected to the third element of the three first planetary gear elements, and the second element of the three third planetary gear elements is connected to the first element of the first planetary gear elements or to the second element of the first planetary gear elements,
 wherein a gear ratio of the third planetary gear set results from a combination of gear ratios that achieve a speed of o of the third element of the third planetary gear set connected to the torque vectoring motor in a straight forward traveling condition in which a differential does not occur; and
 wherein in a case in which an element of the three third planetary gear elements is rotated in a same direction as the output shaft by driving the torque vectoring motor in a first direction, a speed of the first output shaft is increased, and a speed of the second output shaft is decreased.

2. The apparatus of claim 1, wherein in a case in which an element of the three third planetary gear elements is rotated in an opposite direction as the output shaft by driving the torque vectoring motor in a second direction opposite the first direction, the speed of the first output shaft is decreased, and the speed of the second output shaft is increased.

3. The apparatus of claim 1, wherein the third element of the three third planetary gear elements connected to the torque vectoring motor is connected to the torque vectoring motor through a speed reduction mechanism.

4. The apparatus of claim 1, wherein:
 the third planetary gear set is a single pinion planetary set; and
 the third sun gear is connected to the first ring gear, the third ring gear is connected to the first carrier, and the third carrier is connected to the torque vectoring motor.

5. The apparatus of claim 4, wherein:
 in a case in which a gear ratio of the first planetary gear set is assumed to be $\lambda_1 = Z_{R1}/Z_{S1}$, a gear ratio of the second planetary gear set is $\lambda_2 = 1/\lambda_1 + 2$ and a speed reduction ratio is $1 + \lambda_1 \lambda_2$; and
 a gear ratio of the third planetary gear set is established with a relationship $\lambda_3 : \lambda_2 - 1$.

6. The apparatus of claim 5, wherein the first element of the three second planetary gear elements connected to the third element of the three first planetary gear elements is directly connected to the third element of the three first planetary gear elements.

7. The apparatus of claim 1, wherein:
 the third planetary gear set is a single pinion planetary set; and
 the third sun gear is connected to the first carrier, the third ring gear is connected to the first ring gear, and the third carrier is connected to the torque vectoring motor.

8. The apparatus of claim 7, wherein:
 in a case in which a gear ratio of the first planetary gear set is assumed to be $\lambda_1 = Z_{R1}/Z_{S1}$, a gear ratio of the second planetary gear set is $\lambda_2 = 1/\lambda_1 + 2$ and a speed reduction ratio is $1 + \lambda_1 \lambda_2$; and
 a gear ratio of the third planetary gear set is established with a relationship $\lambda_3 : \lambda_2 - 1$.

9. The apparatus of claim 1, wherein:
 the third planetary gear set is a double pinion planetary gear set; and
 the third sun gear is connected to the first carrier, the third carrier is connected to the first ring gear, and the third ring gear is connected to the torque vectoring motor.

10. The apparatus of claim 9, wherein:
 in a case in which a gear ratio of the first planetary gear set is assumed to be $\lambda_1 = Z_{R1}/Z_{S1}$, a gear ratio of the second planetary gear set is $\lambda_2 = 1/\lambda_1 + 2$ and a speed reduction ratio is $1 + \lambda_1 \lambda_2$; and
 a gear ratio of the third planetary gear set is established with a relationship $\lambda_3 = \lambda_2/(\lambda_2 - 1)$.

11. The apparatus of claim 1, wherein:
 the third planetary gear set is a double pinion planetary gear set; and
 the third sun gear is connected to the first ring gear, the third carrier is connected to the first carrier, and the third ring gear is connected to the torque vectoring motor.

12. The apparatus of claim 11, wherein:
 in a case in which a gear ratio of the first planetary gear set is assumed to be $\lambda_1 = Z_{R1}/Z_{S1}$, a gear ratio of the second planetary gear set is $\lambda_2 = 1/\lambda_1 + 2$ and a speed reduction ratio is $1 + \lambda_1 \lambda_2$; and
 a gear ratio of the third planetary gear set is established with a relationship $\lambda_3 = \lambda_2/(\lambda_2 - 1)$.

13. The apparatus of claim 1, wherein:
 the third planetary gear set is a double pinion planetary gear set;
 the third sun gear is connected to the first ring gear, the third carrier is connected to the first carrier, and the third ring gear is connected to the torque vectoring motor;
 in a case in which a gear ratio of the first planetary gear set is assumed to be $\lambda_1 = Z_{R1}/Z_{S1}$, a gear ratio of the second planetary gear set is $\lambda_2=1/\lambda_1+2$ and a speed reduction ratio is $1+\lambda_1\lambda 2$; and a gear ratio of the third planetary gear set is established with a relationship $\lambda_3=\lambda_2$.

14. An electric vehicle drive apparatus for decreasing a drive speed of a motor and transferring the decreased drive speed to an output shaft, the apparatus comprising:

a first planetary gear set comprising three first planetary gear elements, the three first planetary gear elements comprising a first sun gear, a first carrier, and a first ring gear, wherein:

a first element of the three first planetary gear elements is connected to the motor; and a second element of the three first planetary gear elements is connected to a first output shaft;

a second planetary gear set comprising three second planetary gear elements, the three second planetary gear elements comprising a second sun gear, a second carrier, and a second ring gear, wherein a first element of the three second planetary gear elements is connected to a second output shaft; and a third planetary gear set comprising three third planetary gear elements, the three third planetary gear elements comprising a third sun gear, a third carrier, a third ring gear, wherein:

a first element of the three third planetary gear elements is connected to a second element of the three second planetary gear elements; and a second element and a third element of the three first planetary gear elements, which are not connected to the motor, are connected to two elements, respectively, of the three third planetary gear elements, and an element of the three third planetary gear elements, which are not connected to the first planetary gear set, is connected to a torque vectoring motor;

wherein a gear ratio of the third planetary gear set results from a combination of gear ratios that achieve a speed of o of the third element of the third planetary gear set connected to the torque vectoring motor in a straight forward traveling condition in which a differential does not occur; and wherein in a case in which an element of the three third planetary gear elements is rotated in a same direction as the output shaft by driving the torque vectoring motor in a first direction, a speed of the first output shaft is increased, and a speed of the second output shaft is decreased.

15. An electric vehicle drive apparatus for decreasing a drive speed of a motor and transferring the decreased drive speed to an output shaft, the apparatus comprising:

a first planetary gear set comprising three first planetary gear elements, the three first planetary gear elements comprising a first sun gear, a first carrier, and a first ring gear, wherein:

a first element of the three first planetary gear elements is connected to the motor; and a second element of the three first planetary gear elements is connected to a first output shaft;

a second planetary gear set comprising three second planetary gear elements, the three second planetary gear elements comprising a second sun gear, a second carrier, and a second ring gear, wherein:

a first element of the three second planetary gear elements is connected to a third element of the three first planetary gear elements; and a second element of the three second planetary gear elements is connected to a second output shaft; and a third planetary gear set comprising three third planetary gear elements, the three third planetary gear elements comprising a third sun gear, a third carrier, and a third ring gear, wherein:

a first element of the three third planetary gear elements is the third sun gear and is configured as the same element as the first ring gear;

a second element of the three third planetary gear elements is connected to the second element of the three first planetary gear elements or the third element of the three first planetary gear elements; and a third element of the three third planetary gear elements is connected to a torque vectoring motor, wherein a gear ratio of the third planetary gear set results from a combination of gear ratios that achieve a speed of o of the third element of the third planetary gear set connected to the torque vectoring motor in a straight forward traveling condition in which a differential does not occur; and wherein in a case in which an element of the three third planetary gear elements is rotated in a same direction as the output shaft by driving the torque vectoring motor in a first direction, a speed of the first output shaft is increased, and a speed of the second output shaft is decreased.

* * * * *

UNITED STATES PATENT AND TRADEMARK OFFICE
CERTIFICATE OF CORRECTION

PATENT NO. : 12,280,659 B1
APPLICATION NO. : 18/600166
DATED : April 22, 2025
INVENTOR(S) : Kwon et al.

Page 1 of 1

It is certified that error appears in the above-identified patent and that said Letters Patent is hereby corrected as shown below:

In the Claims

In Column 9, Line 48, Claim 1:
Change "of o of the third element of the third planetary gear set"
To --of 0 of the third element of the third planetary gear set--

In Column 11, Line 37, Claim 14:
Change "of o of the third element of the third planetary gear set"
To --of 0 of the third element of the third planetary gear set--

In Column 12, Line 36, Claim 15:
Change "of o of the third element of the third planetary gear set"
To --of 0 of the third element of the third planetary gear set--

Signed and Sealed this
Tenth Day of June, 2025

Coke Morgan Stewart
*Acting Director of the United States Patent and Trademark Office*